United States Patent

Oeffling et al.

[11] Patent Number: 5,040,575
[45] Date of Patent: Aug. 20, 1991

[54] FUEL TANK WITH VAPOR TRAP CONNECTION TO FILLER PIPE

[75] Inventors: Heiner Oeffling, Wolfschlugen; Harald Böhringer, Neuhausen; Dieter Scheurenbrand, Wolfschlugen, all of France

[73] Assignee: Daimler-Benz Aktiengesellschaft, Stuttgart, Fed. Rep. of Germany

[21] Appl. No.: 469,020

[22] Filed: Jan. 23, 1990

Related U.S. Application Data

[62] Division of Ser. No. 282,559, Dec. 13, 1988, abandoned.

[30] Foreign Application Priority Data

Dec. 12, 1987 [DE] Fed. Rep. of Germany ....... 3742258

[51] Int. Cl.[5] .......................... B65B 31/00; B65B 90/00
[52] U.S. Cl. .................................. 141/44; 220/85 VS; 220/86 R; 141/285; 141/54; 141/307; 141/302; 137/588
[58] Field of Search ..................... 141/44, 45, 285, 54, 141/55, 304, 307, 47, 59, 302; 220/85 VS, 85 VR, 86 R; 137/587, 588, 589

[56] References Cited

U.S. PATENT DOCUMENTS

| 4,142,647 | 3/1979 | Walters | 220/858 |
| 4,724,861 | 2/1988 | Covert et al. | 137/388 |
| 4,742,809 | 5/1988 | Ito et al. | 220/85 VR |
| 4,809,863 | 3/1989 | Woodcock et al. | 220/85 VS |
| 4,869,283 | 9/1989 | Oeffling et al. | 220/86 R |
| 4,874,020 | 10/1989 | Bucci | 141/285 |

FOREIGN PATENT DOCUMENTS 3605708 10/1986 Fed. Rep. of Germany.
3607844 1/1987 Fed. Rep. of Germany.

Primary Examiner—Henry J. Recla
Assistant Examiner—Keith Kupfebchmid
Attorney, Agent, or Firm—Evenson, Wands Edwards, Lenahan & McKeown

[57] ABSTRACT

A fuel tank having a trapping device arranged in its filler pipe for trapping fuel vapors during refuelling which has an internal closure flap which not only closes off an end of the filler pipe but also closes off connection to an activated carbon filter. Insertion of a fuel nozzle opens the flap valve.

4 Claims, 4 Drawing Sheets

1

FUEL TANK WITH VAPOR TRAP CONNECTION TO FILLER PIPE

BACKGROUND OF THE INVENTION

The invention relates to a fuel tank having a fuel vapor trapping device, arranged in its filler pipe for trapping fuel vapors during refuelling and comprising a tank space located above a maximum fuel fill line which space is connected to an activated carbon filter through a vapor line which has a self closing valve moveable into a first open position to allow connection to the tank space.

A fuel tank having a trapping device of this general kind is known (German Offenlegungsschrift No. 3,605,708). The control valve of this trapping device ensures that there is no connection between the activated carbon filter and the fuel tank when the filler pipe is closed and that a desired positive pressure is maintained in the fuel tank, given appropriate design of a ventilating device. In addition, it is ensured that no fuel can escape into the open from the fuel tank via the activated carbon filter in the event of the fuel tank being in an inclined or upside down position due to an accident.

For refuelling, the control valve of this trapping device is to be brought into its open position so that the fuel vapors, which are composed of hydrocarbons and therefore highly injurious to health, cannot flow out of the fuel tank into the atmosphere but can flow off into the activated carbon filter.

In this arrangement, the fuel dispenser filler nozzle which is Placed into the filler pipe for filling the fuel tank also serves indirectly to open the control valve. In order to avoid the possibility of relatively large quantities of fuel vapors flowing out into the open as the dispenser filler nozzle is being introduced, a guide channel, which restricts the filler pipe and receives the fuel dispenser filler nozzle in a sealing fashion, is provided inside the filler pipe. The inner end of the guide channel is held closed in gastight fashion by means of a self-closing closure flap when the fuel dispenser has been removed from the filler pipe.

In this arrangement, the control valve forms a self-contained constructional unit. The valve element of this unit can be moved mechanically into an open through-flow position by the closure flap as it is pivoted into its open position by means of the fuel dispenser filler nozzle.

For this purpose, the closure flap is equipped with a forked operating lever. The fork legs come to rest against a head of a valve element shaft of the control valve when the closure flap is pivoted into its open position to thereby displace the valve element against the action of a restoring force into its open through-flow position. This establishes a connection of the fuel tank with the activated carbon filter. Fuel vapors can thereby flow off during the refuelling procedure without escaping from the filler pipe.

For the control valve, this known construction requires a valve mechanism with a specially designed valve element which can be operated by the closure flap. This likewise requires a special design, as well as two vapor lines located outside the filler pipe and connected to the control valve and filler pipe, one of which lines is to be guided away from the fuel tank and the other is to be connected to the activated carbon filter.

It is the object of the present invention to simplify both the design and installation of the control valve and the means required for its actuation as well as to design them in such a way that only a single line needs to be installed outside the filler pipe. This line being one connecting the control valve to the activated carbon filter.

According to the invention, this object is achieved, by having the closure flap act as the valve mechanism to both seal off the inlet fuel opening as well as seal off the passage from the fuel tank space into the activated carbon filter.

Thus in the design according to the invention, a special valve element is dispensed with because the closure flap takes over its function. In this arrangement, an opening to be closed by the closure flap forms the control valve seat situated inside the filler pipe, so that the filler pipe is simultaneously given the function of a line for connecting the tank space accommodating the fuel vapors to the control valve.

An embodiment of the invention offers the possibility of combining the components necessary for discharging fuel vapors into the activated carbon filter to form a single constructional unit which can be easily inserted into the filler pipe by having a housing with a guide channel for sealing enclosing the fuel nozzle with an end opening adjacent a second end opening leading to the carbon filler and having the flap valve close both end openings simultaneously.

At the same time, the first opening is alligned with the fuel nozzle and is spaced from the seal for the fuel nozzle. Also, the opening of the guide channel which restricts the filler pipe and receives the fuel dispenser filler nozzle, is to be closed by the closure flap and simultaneously also forms the valve seat of the control valve to the carbon filter.

In one embodiment of the invention, the valve seat of the control valve is formed by an additional end wall opening of a housing which can be inserted into the filler pipe, with the advantage that a valve space, which is independent of the guide channel and is to be connected directly to the activated carbon filter, can be provided directly behind this end wall opening.

A further advantage is obtained when the closure flap is in the closing position, i.e. while the control valve is closed. Here balanced pressure conditions prevail between the fuel tank and the guide channel due to a further opening in the housing, and accordingly the closure flap can easily be pivoted into its open position. In the case of a disproportionately large pressure rise in the fuel tank, caused for example, by fire, the positive pressure can be held at an uncritical level by the filler pipe cap, which is customarily designed as a pressure-relief valve.

A further advantage of the invention arises when the pressure balance between the fuel tank and the guide channel is brought about only when a certain positive pressure is reached. This ensures that no fuel can run out, for example during cornering, if no-one has remembered to close the filler pipe correctly after refuelling has been carried out. In addition, it is thereby ensured that when the filler pipe is opened, it is not possible for fuel either to escape in the form of vapor or slosh out of the pipe orifice.

Other objects, advantages and novel features of the present invention will become apparent from the following detailed description of the invention when considered in conjunction with the accompanying drawings.

DETAILED DESCRIPTION OF THE DRAWINGS

Figure 1:
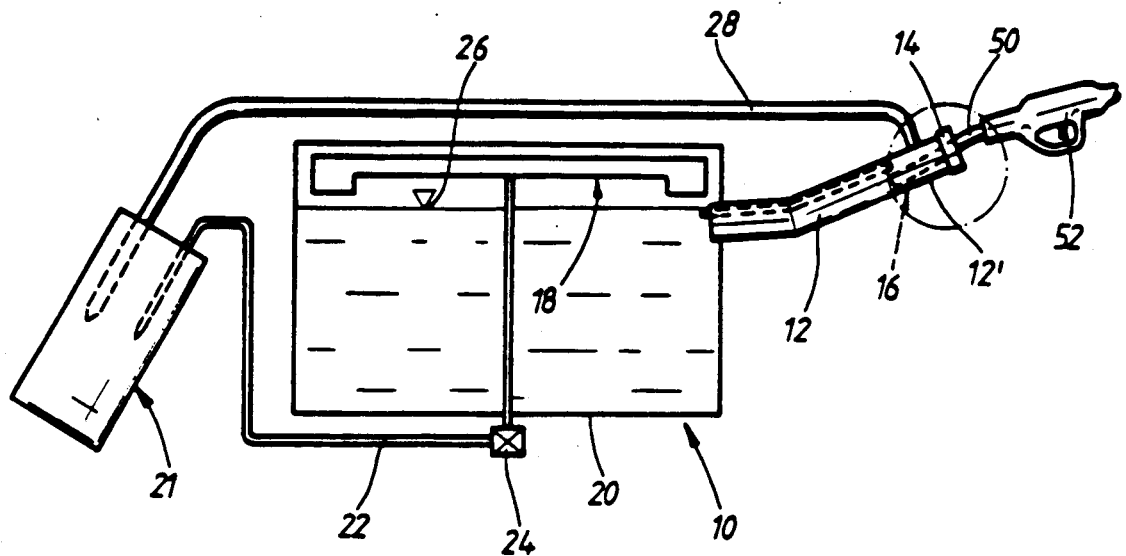
FIG. 1 shows, in highly schematic form, an overall view of a fuel tank, the filler pipe of which is designed with a device for trapping fuel vapors.

FIG. 1 shows a fuel tank 10 with a fuel vapor trapping device 16 for trapping fuel vapors during refuelling, which is located inside endpiece 12' of a gas tank filler pipe 12, the filler pipe is closed by cap 14. A known type of ventilating device 18, is installed in the fuel tank 10 and is connected to a vent line 22 which emerges from the fuel tank base 20 and leads to an activated carbon filter 21. The vent line is fitted with a tank breather valve 24.

The fuel vapor trapping device 16 is situated in the filler pipe endpiece 12' above the maximum tank filling level 26. It forms a constructional unit which is inserted in a sealed fashion into the interim of filler pipe endpiece 12' and is connected via a connecting line 28, to an activated carbon filter 21.

Figure 2:
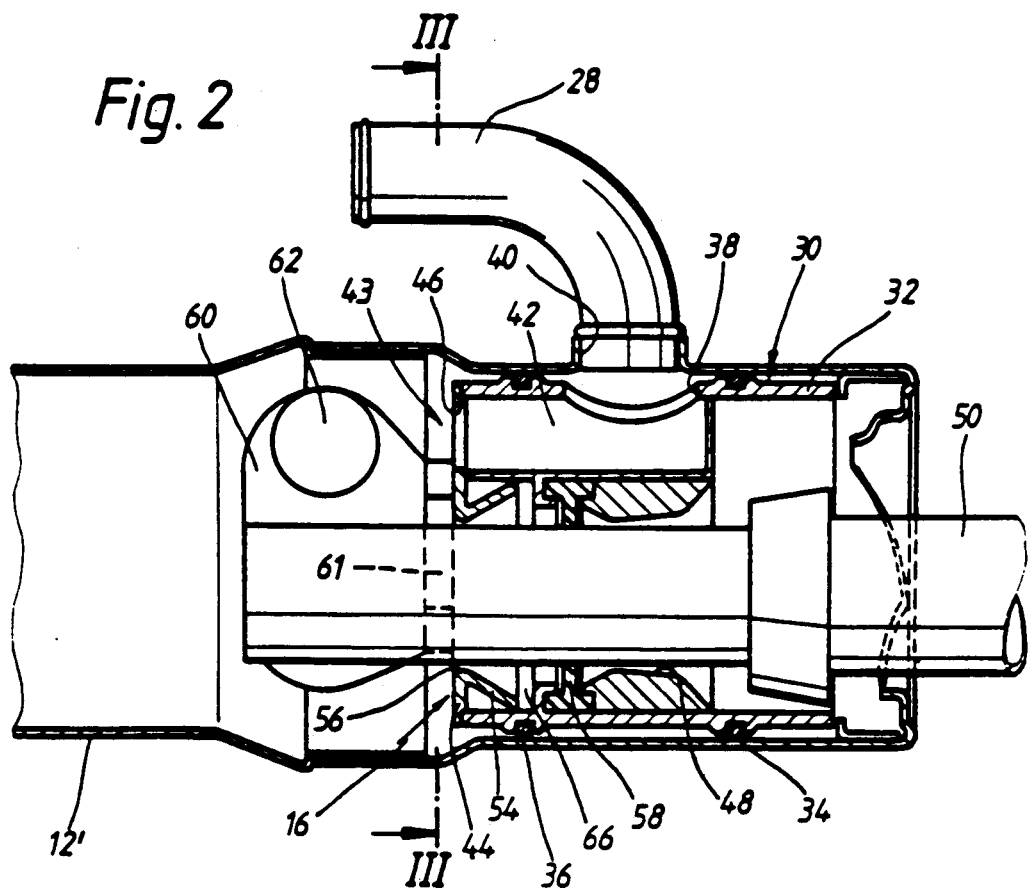
FIG. 2 shows a detail indicated in FIG. 1 by a chain-dotted circle, represented on an enlarged scale and in longitudinal section, a first exemplary embodiment of the invention with the closure flap in its open position.

As shown in FIG. 2, the trapping device 16 has a cylindrical housing 30, the housing shell 32 of which carries at its outer Periphery two sealing rings 34 and 36, spaced at an axial interval from one another, and which rest sealingly on the inner periphery of the filler pipe endpiece 12'. Between the two sealing rings 34 and 36 there is an opening 38 in the housing shell 32, which leads to a connecting orifice 40, of the connecting line 28.

The opening 38 in the housing shell 32 opens radially into a valve space 42 of a control valve 43, located within the housing 30. The control valve 43 is accessible from the interior of the pipe only via an end wall opening 46 in a housing end wall 44 which faces the fuel tank 10. At a radial interval from the valve space 42 there is a guide channel 48 in the housing 30 which extends parallel to the axis of the housing and into which the filler nozzle 50 of a fuel dispenser 52 can be introduced for the purpose of refuelling.

End wall 44 of the housing 30 opens into a funnel 54 which tapers in the direction of filler nozzle 50 and with its smallest diameter forming a further end wall opening 56.

Numeral 58 designates a sealing ring which is arranged in the guide channel 48 to surround an inserted fuel dispenser filler nozzle 50 to sealingly encloses the outer periphery of the nozzle 50 and thus ensures that fuel vapors present in the filler pipe 12 cannot escape into the atmosphere via the guide channel 48.

Figure 3:
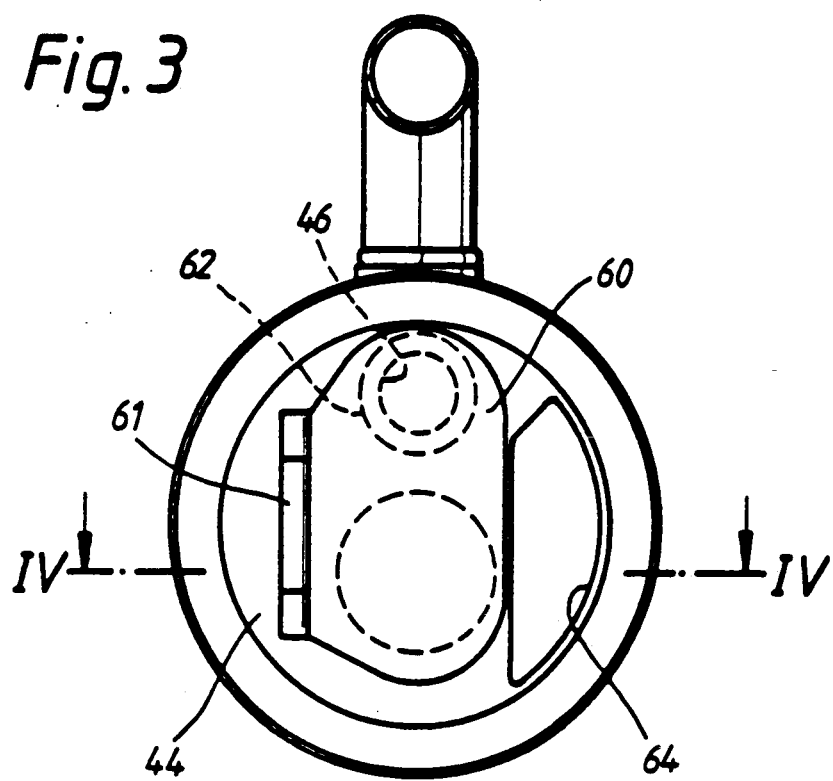
FIG. 3 shows a section along the line III—III in FIG. 2, except that the closure flap is in its closing position.

A common closure flap 60 is provided for both end wall openings 46 and 56 and is hinged on the housing end wall 44 at 61 (see FIG. 3). The flap 60 can be pivoted into its open or throughflow position (FIG. 2) against the action of a restoring torsion spring (not shown) by the fuel dispenser filler nozzle 50, when the latter is introduced into the guide channel 48 and through the end wall opening 56.

The closure flap 60 forms a valve element for the control valve 43, which valve element can be moved between a closing and a open throughflow position. For the purpose of a reliable valve closure, the closure flap 60 is additionally equipped with a disc-shaped elastomer seal 62, which rests on the edge of the end wall opening 46 when the valve is closed (see FIG. 3).

Figure 4:
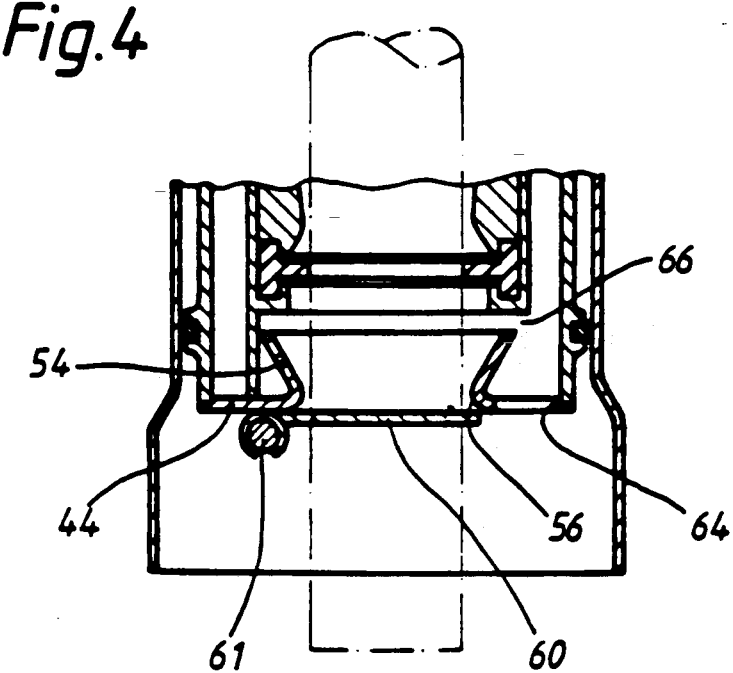
FIG. 4 shows a part section of the line IV—IV, in FIG. 3.

The housing end wall 44 also contains a further end wall opening 64 (see FIG. 3 and 4) of a bypass from the fuel tank 10 to the filler pipe 12 closing cap 14, which is preferably equipped with a safety valve (not shown) and is connected via intermediate space 66 (FIG. 2 and 4) extending between the funnel 54 and the guide channel 48 when the fuel dispenser filler nozzle 50 has been removed from the filler pipe 12. When the closure flap 60 is closed, the same pressure prevails in the region of the guide channel 48 up to the closing cap 14 as in the remaining part of the filler pipe 12 and in the fuel tank 10. This enables the closure flap 60 to be opened easily. The closure flap ensures that no fuel can flow into the activated carbon filter 21 via the control valve 43 in the upside down position of the fuel tank 10.

Figure 5:
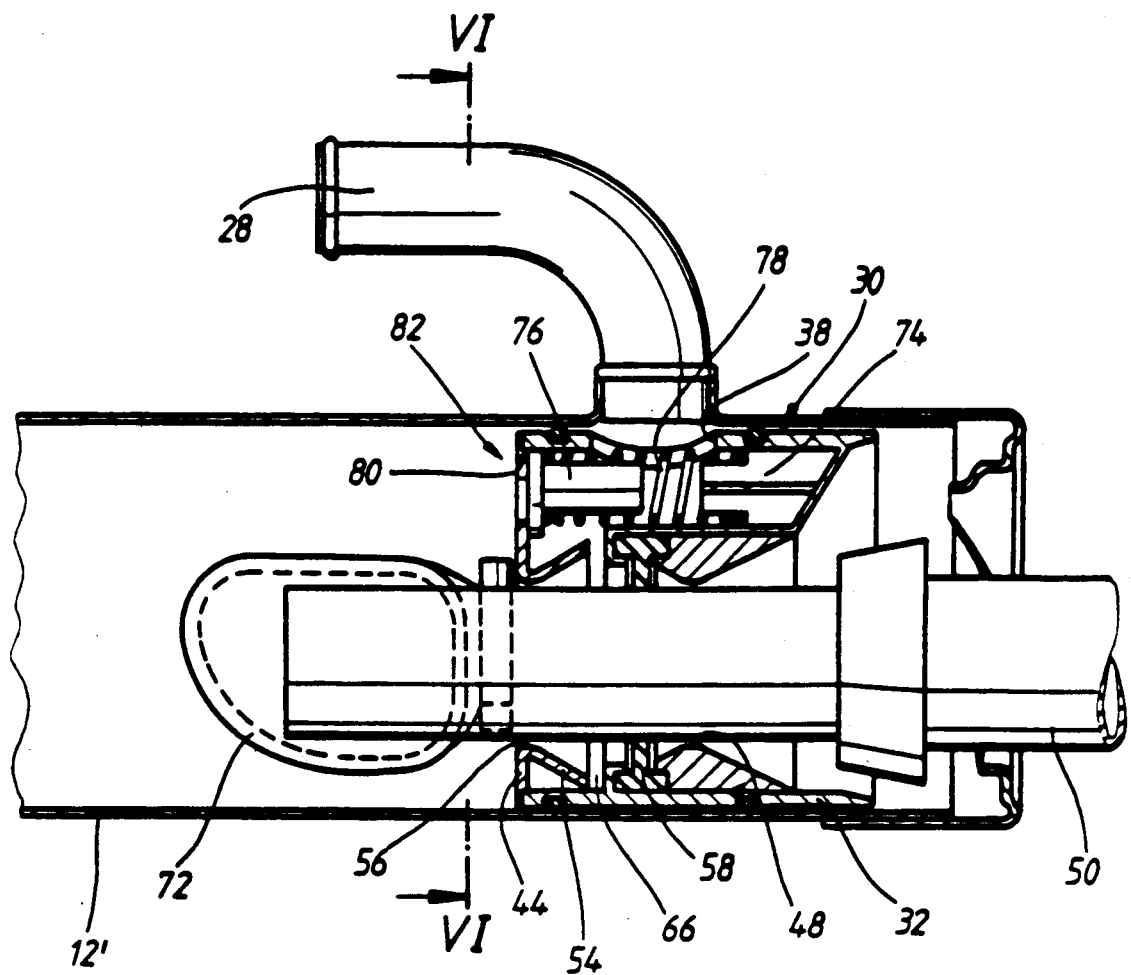
FIG. 5 shows a representation similar to FIG. 2, to illustrate a second exemplary embodiment of the invention.
Figure 6:
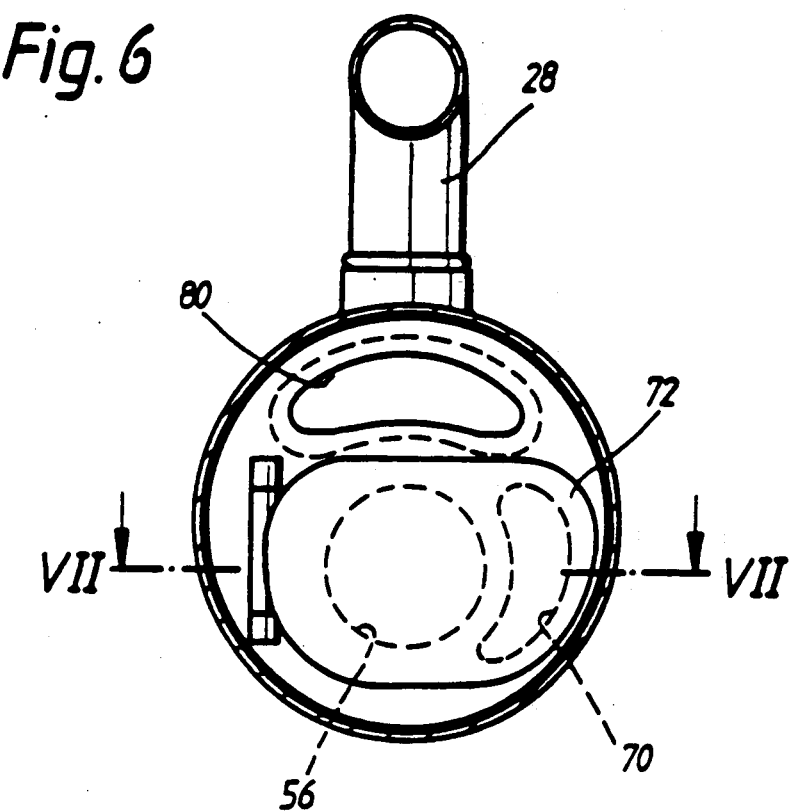
FIG. 6 shows a section along the line VI—VI in FIG. 5, the closure flap being in its closing position.
Figure 7:
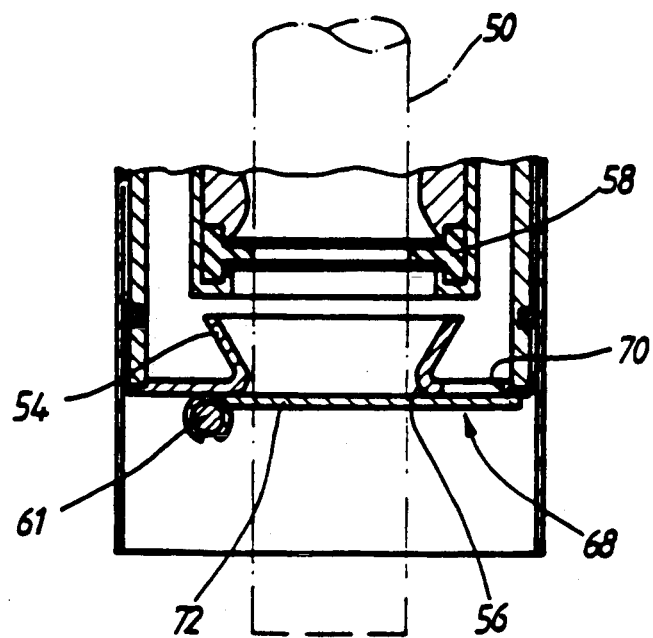
FIG. 7 shows a part section along the line VII—VII in FIG. 6.

The design variant according to FIGS. 5 to 7 is distinguished from the design described above in that, instead of the end wall opening 64 forming the bypass, an end wall opening 70 is provided which forms a part of a control valve 68 and which is closed by a closure flap 72. The opening 70 is connected via intermediate space 66 to the connecting line 28 leading to the activated carbon filter 21. Instead of the valve space 42, a housing space 74 is connected to the connecting line 28. A valve element 76 is displaceably arranged within that housing space 74 along with a compression spring 78 which constantly attempts to hold valve element 76 in its closing position, keeping end wall opening 80 closed and thus, forming a safety valve 82.

In an upside down position of the fuel tank 10, this embodiment of the trapping device likewise prevents fuel from running into the activated carbon filter 21 with the closure flap 72 closed. Furthermore, even when the filler pipe 12 has been left open, no fuel will run out of the latter, nor will fuel slosh out when the filler pipe 12 is opened.

In addition, this design prevents the emergence of fuel vapors during the opening of the pipe. Finally, the safety valve 82 opens when a certain positive pressure is reached in the fuel tank, with the result that the internal pressure of the tank can be kept at an uncritical level.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A fuel tank having a trapping device arranged in its filler pipe for trapping fuel vapors during refuelling, comprising:

a fuel tank having a filter pipe and defining a space located above a maximum fuel filling level of the fuel tank and communicates with an activated carbon filter which is directly connected to an engine fuel filter intake pipe;

a self-closing control valve normally closing off the communication between the fuel tank space and the activated carbon filter and operable to allow the communication therebetween;

a closure flap located proximate in a guide channel to control the control valve into its open position, which guide channel is configured to seal the inside of the fuel filler intake pipe when a fuel dispenser filler nozzle is inserted into the guide channel;

the closure flap working against a closing force;

wherein the closure flap also forms a valve element of the control valve;

the closure flap and the guide channel comprise a housing insertably arranged in a sealed fashion in a closable endpiece of the filler pipe;

the housing further includes a shell opening arranged between the closure flap and the direct connection between the filler pipe and the activated carbon filter;

the guide channel contains a seal for sealingly enclosing an inserted fuel dispsenser filler nozzle;

an end wall of the housing is located at a distance from the seal and has an end wall circular opening aligned with the guide channel and closed by the closure flap;

the diameter of the end wall circular opening is larger than an outside diameter of a fuel dispenser filler nozzle;

a space between the seal and the end wall circular opening communicates with the shell opening of the housing;

an additional end wall opening communicates with the space existing between the seal and the end wall circular opening, defining a valve seat, a safety valve in the housing adjacent the shell opening biased against said value seat; and the additional end wall opening is connected with the shell opening of the housing during an opened condition of the safety valve.

2. A fuel tank arrangement according to claim 1 wherein the safety valve is constructed as a spring biased piston and wherein the piston acts as a valving element to close off the additional wall opening.

3. A fuel tank arrangement according to claim 2 wherein the safety valve is located adjacent the guide channel.

4. A fuel tank arrangement according to claim 1 wherein the safety valve is located adjacent the guide channel.

* * * * *